(12) United States Patent
Beck et al.

(10) Patent No.: US 10,452,800 B2
(45) Date of Patent: Oct. 22, 2019

(54) ROUTING OF NETS OF AN INTEGRATED CIRCUIT

(71) Applicant: INTERNATIONAL BUSINESS MACHINES CORPORATION, Armonk, NY (US)

(72) Inventors: Manuel Beck, Kirchheim unter Teck (DE); Sven Peyer, Tuebingen (DE); Christian Schulte, Boeblingen (DE); Wolfram Ziegler, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 14/741,504

(22) Filed: Jun. 17, 2015

(65) Prior Publication Data
US 2016/0371401 A1 Dec. 22, 2016

(51) Int. Cl.
*G06F 17/50* (2006.01)

(52) U.S. Cl.
CPC ........ *G06F 17/505* (2013.01); *G06F 17/5077* (2013.01)

(58) Field of Classification Search
None
See application file for complete search history.

(56) References Cited

U.S. PATENT DOCUMENTS

| | | | |
|---|---|---|---|
| 5,654,898 A * | 8/1997 | Roetcisoender | .... G06F 17/5068 716/114 |
| 6,886,152 B1 * | 4/2005 | Kong | ................ G06F 17/5077 716/128 |
| 7,111,268 B1 | 9/2006 | Anderson et al. | |
| 8,745,565 B2 | 6/2014 | Gao | |
| 8,751,996 B1 | 6/2014 | Birtch et al. | |
| 2008/0209376 A1 * | 8/2008 | Kazda | .................. G06F 17/5068 716/113 |
| 2010/0128760 A1 * | 5/2010 | Ballard | ................ G06F 17/5077 375/214 |

(Continued)

OTHER PUBLICATIONS

Beck, Manuel et al., "Routing of Nets of an Integrated Circuit," U.S. Appl. No. 14/941,579, filed Nov. 14, 2015, pp. 1-30.

(Continued)

*Primary Examiner* — Vuthe Siek
*Assistant Examiner* — Aric Lin
(74) *Attorney, Agent, or Firm* — Heslin Rothenberg Farley & Mesiti P.C.; William A. Kinnaman, Jr.

(57) ABSTRACT

A routing specification is received for nets of an integrated circuit connecting source cells and sink cells in the integrated circuit. A target performance parameter is received for each of the nets, the target performance parameters specifying a propagation property of electrical signals in the nets. Layouts of the nets are generated according to the routing specification. An actual performance parameter for each of the nets in the layouts is generated, in which the actual performance parameters specify a calculated actual propagation property of electrical signals in the nets. A deviation parameter is generated for each of the performance parameters. Each of the deviation parameters is indicative of a degree of deviation of the respective actual performance parameter from its target performance parameter.

4 Claims, 4 Drawing Sheets

(56) References Cited

U.S. PATENT DOCUMENTS

| | | | | |
|---|---|---|---|---|
| 2012/0284683 A1* | 11/2012 | Alpert | ................ | G06F 17/5031 |
| | | | | 716/129 |
| 2013/0326458 A1* | 12/2013 | Kazda | ................ | G06F 17/5077 |
| | | | | 716/129 |
| 2015/0178437 A1* | 6/2015 | Zhang | ................ | G06F 17/5081 |
| | | | | 716/113 |

OTHER PUBLICATIONS

List of IBM Patents or Patent Applications Treated as Related, dated Mar. 18, 2016, pp. 1-2.

\* cited by examiner

ROUTING OF NETS OF AN INTEGRATED CIRCUIT

BACKGROUND

Modern integrated circuits have billions of discrete elements (e.g. transistors). Terminals of the discrete elements are connected by multi-level wiring. The wiring is one of the elements of the integrated circuits determining an upper limit of clock frequencies of the integrated circuits. The wiring is to be designed in a way that it enables error free propagation of electrical signals synchronized with the clock frequency. This means that electrical signals are to be received at receiving terminals within a time window in a tact interval. The receipt of electrical signals is to be error free. As usual, it requires not only timely receiving of the electrical signals at the receiving terminals but also satisfying a required slew rate of the electrical signals at the receiving terminals.

Modern digital circuitry has tolerances for error free propagation of electrical signals in the picosecond range. The problem of finding an appropriate wiring topology is complicated by the need to connect billions of terminals of the discrete elements. This means that not only propagation of electrical signals in the wiring is to be taken into account but parasitic electromagnetic interactions of electrical signals propagating in adjacent wires are to be taken into account as well. The last but not least problem is that a complete performance of the wiring can be calculated only when the wiring topology is completely generated. As a consequence, a process of generation of the wiring topology is performed as usual just using simple design rules being primarily derived from constraints of an integrated circuit manufacturing process. Thus, there is a need to improve the process of the generation of the wiring topology.

SUMMARY

One or more aspects improve the process of the generation of the wiring topology in a way that information related to the electrical performance of the wiring is taken into account during generation of the wiring topology resulting in a solution meeting the requirements of electrical performance of the wiring One or more aspects provide for a method of generating layouts of nets connecting source cells and sink cells in an integrated circuit, a system for performing the method, and a computer readable medium having stored thereon a computer executable code for execution by a computer processor controlling a computer system comprising a memory, wherein execution of the instructions of the executable code causes the computer processor to execute the method.

One embodiment provides for a computer-implemented method of generating layouts of nets connecting source cells and sink cells in an integrated circuit. The method includes, for instance, receiving a routing specification for the nets of the integrated circuit and a target performance parameter for each of the nets, the target performance parameters specifying a propagation property (e.g., a required propagation property) of electrical signals in the nets; generating layouts of the nets according to the routing specification; generating an actual performance parameter for each of the nets in the layouts, the actual performance parameters specifying a calculated actual propagation property of electrical signals in the nets; generating a deviation parameter for each of the performance parameters, each of the deviation parameters being indicative of a degree of deviation of the respective actual performance parameter from its target performance parameter; and repetitively executing the following: generating new layouts of the nets according to the routing specification, the order of the generation being determined by a ranking of each net, the ranking being performed according to the respective deviation parameter of each net, generating an updated performance parameter for each of the new layouts, and updating the deviation parameter for each of the new layouts with the respective updated performance parameter, the repetitive execution being performed either until a first or a second condition is fulfilled, the first condition comprising that at least one of the deviation parameters is less than a first threshold value, the second condition comprising that for the present iteration the performance parameter for a newly layout net has an improvement over the respective performance parameter of the previous iteration with the improvement being less than a second threshold value.

Another embodiment provides for a computer system for generating layouts of nets connecting source cells and sink cells in an integrated circuit. The computer system includes, for instance, a memory; and a processor in communications with the memory, wherein the computer system is configured to perform a method. The method includes, for instance, receiving a routing specification for nets of an integrated circuit connecting source cells and sink cells in the integrated circuit and a target performance parameter for each of the nets, the target performance parameters specifying a propagation property of electrical signals in the nets; generating layouts of the nets according to the routing specification; generating an actual performance parameter for each of the nets in the layouts, the actual performance parameters specifying a calculated actual propagation property of electrical signals in the nets; generating a deviation parameter for each of the performance parameters, each of the deviation parameters being indicative of a degree of deviation of the respective actual performance parameter from its target performance parameter; and repetitively executing the following: generating new layouts of the nets according to the routing specification, the order of the generation being determined by a ranking of each net, the ranking being performed according to a respective deviation parameter of each net; generating an updated performance parameter for each of the new layouts; and updating the deviation parameter for each of the new layouts with the respective updated performance parameter, the repetitive execution being performed either until a first or a second condition is fulfilled, the first condition including that at least one of the deviation parameters is less than a first threshold value, the second condition including that for a present iteration the performance parameter for the new layout net has an improvement over a respective performance parameter of a previous iteration with the improvement being less than a second threshold value.

A further embodiment provides for a computer program product for generating layouts of nets connecting source cells and sink cells in an integrated circuit. The computer program product includes, for instance, a computer readable storage medium readable by a processing circuit and storing instructions for execution by the processing circuit for performing a method. The method includes, for instance, receiving a routing specification for the nets of the integrated circuit and a target performance parameter for each of the nets, the target performance parameters specifying a propagation property of electrical signals in the nets; generating layouts of the nets according to the routing specification; generating an actual performance parameter for each of the nets in the layouts, the actual performance parameters specifying a calculated actual propagation property of electrical signals in the nets; generating deviation parameters, each of the deviation parameters being indicative of a degree of deviation of the respective actual performance parameter from its target performance parameter; and repetitively executing the following: generating new layouts of the nets according to the routing specification, an order of the generation being determined by a ranking of each net, the ranking being performed according to a respective deviation parameter of each net; generating an updated performance parameter for each of the new layouts; and updating the deviation parameter for each of the new layouts with the respective updated performance parameter, the repetitive execution being performed until a first condition or a second condition is fulfilled, the first condition comprising that at least one of the deviation parameters is less than a first threshold value, and the second condition comprising that for a present iteration a performance parameter for a new layout net has an improvement over a respective performance parameter of a previous iteration with the improvement being less than a second threshold value.

BRIEF DESCRIPTION OF THE DRAWINGS

In the following, embodiments of the invention will be described in greater detail by way of example only making reference to the drawings in which.

DETAILED DESCRIPTION

Figure 1:
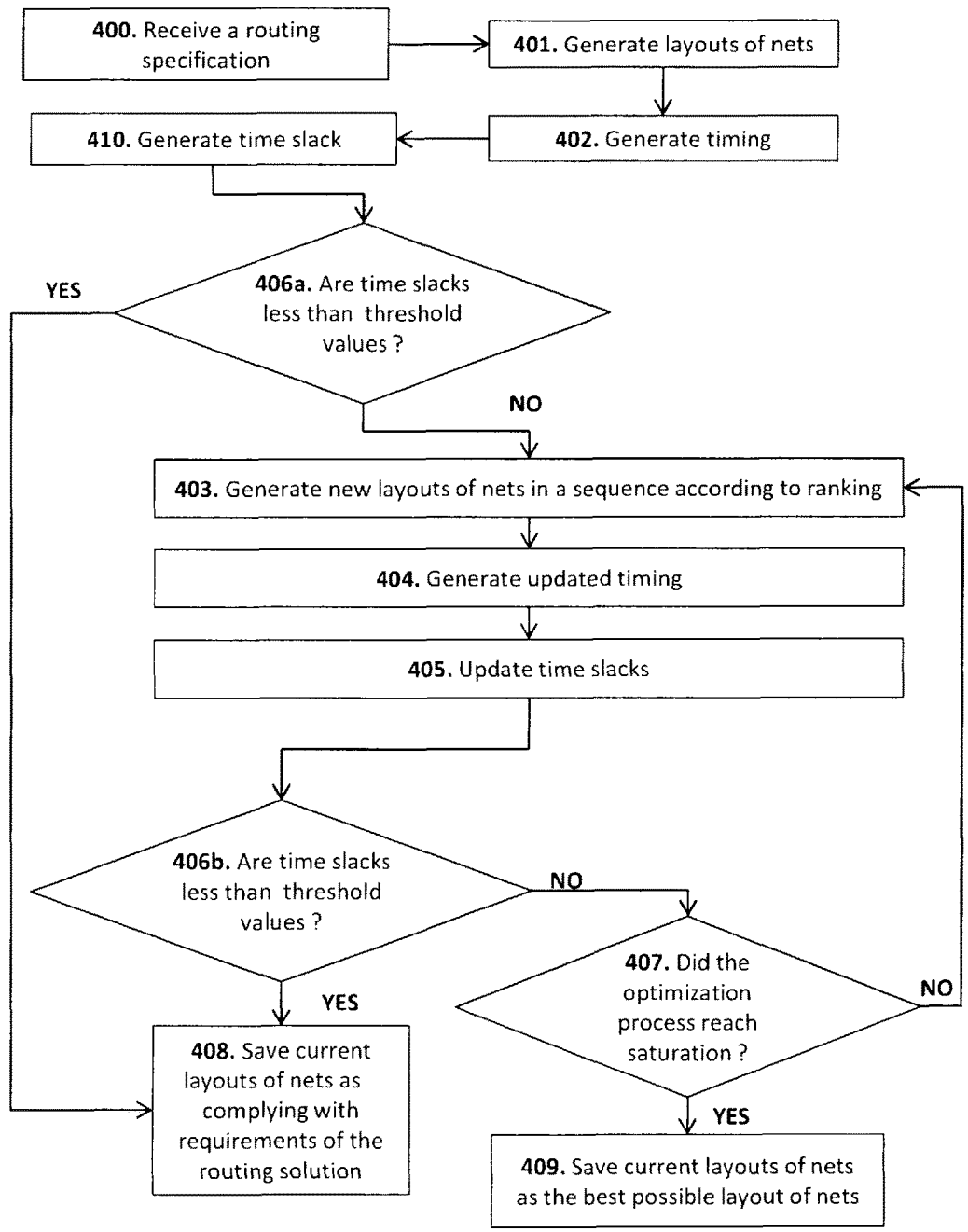
FIG. 1 illustrates a flow diagram of a process for generating layouts of nets connecting source cells and sink cells in an integrated circuit.

Source cells and sink cells are connected by nets in the integrated circuit. The nets are implemented in a form of a multilevel metal wiring in integrated circuits. The source cells and the sink cells can be, for instance, terminals of discrete elements of the integrated circuit, such as transistors and/or logical gates. One source cell is connected with one or more sink cells. In other words, the net fans out an electrical signal from the source cell to one or more sink cells. In order to provide error free propagation of electrical signals in the nets, the layout of the nets is to comply with a number of criteria. One criterion can be the time of error free propagation of the electrical signal in the nets. This time is needed to transfer electrical signals representing logical values from the source cells to the sink cells. Another criterion can be a slew rate of the electrical signals generated at the sink cells. Compliance with these criteria among other factors determines operation of the integrated circuit at the desired clock frequency.

Generation of layouts of nets connecting source cells and sink cells in the integrated circuit is performed in two steps, as an example: first, layouts of the nets are generated according to a provided routing solution, and afterwards, the performance of the nets is evaluated. The routing solution specifies the electrical connections between the source cells and the sink cells and target performance parameters of the nets, such as time of error free propagation of the electrical signals in the net and/or the slew rates. Initial generation of the layouts is performed using constraints derived from design rules determined by a manufacturing process used for manufacturing of the integrated circuit and estimations of the actual performance parameters of the nets calculated during the generation of the layouts. The evaluation of the performance of the nets enables calculation of actual performance parameters. Comparison of the target performance parameters with the actual performance parameters enables to draw a conclusion whether the generated layouts comply with the specifications of the routing solution. Since the calculation of the actual performance parameters can be performed only after the generation of the layouts is completed, there is a need for generation of additional constraints for the generation of the layouts.

This problem is addressed by an embodiment using iterative execution of the generation of all layouts and the evaluation of the performance of the nets. Additional constraints for the next generation of the layouts are derived on a basis of the previous evaluation of the performance of the nets. The layouts of the nets having the worst performance are generated before the other layouts of the nets having better performance. Additional topological limitations for the subsequent generation of the layouts of the nets can be derived from the actual performance parameters calculated on a basis of the previously generated layouts of the nets. This way of iterative optimization of the layouts may enable computer automated design of the layouts instead of a trial and error procedure of generation of the layouts operated by a designer of the integrated circuits.

The iterative execution of the optimization can be stopped either when the last generated layouts comply with the specifications of the routing solution or when the optimization process has reached saturation and as a consequence thereof no substantial improvement of the actual performance parameters is possible any more. In the latter case, the iterative optimization of the layouts delivers the best possible layouts. The saturation of the iterative optimization can be determined when an improvement of the actual performance parameter of one of the nets achieved as a result of the execution of the last iteration is below a first threshold value.

Embodiments may be described by a system, a method, and/or a computer program product. The computer program product may include a computer readable storage medium (or media) having computer readable program instructions thereon for causing a processor to carry out aspects of the present invention.

In another embodiment, deviation parameters are measures of degree of deviation of the actual performance parameters from their respective target performance parameters. The net having the layout in which the performance parameter is used for the determination of the saturation of the optimization has the biggest deviation parameter in comparison with the other deviation parameters of the other nets calculated as a result of execution of the last iteration.

This way of determination of the saturation of the optimization can enable effective monitoring of the performance of the optimization. It may be sufficient to monitor only the performance of the net, which layout has the biggest deviation parameter, since the performance of this net can limit the performance of an entire integrated circuit.

In another embodiment, the method further includes generating an indicator value for a set of the deviation parameters. The indicator value is a measure of a difference between a sum of the deviation parameters of the set of deviation parameters generated in the previous iteration and a sum of the deviation parameters of the set of deviation parameters generated in the present iteration. The optimization is stopped when the indicator value is less than a second threshold value and the criterion of the aforementioned embodiment is fulfilled.

This embodiment can enable generation of the best possible layouts for a set of nets in which deviation parameters are used for calculation of the indicator value. The set can comprise some of the nets or all of the nets.

In another embodiment, the target performance parameter specifies a propagation property (e.g., a required propagation property) of electrical signals in the net comprising a time of error free propagation of the electrical signal in the net.

In another embodiment, the degree of deviation is a function of a difference between the actual performance parameter and its respective target performance parameter.

In another embodiment, the propagation property comprises a slew rate.

In another embodiment, the order of the generation of the layouts is determined by a ranking of each net. The ranking is described by a monotonically decreasing function of the deviation parameter. The generation of the new layouts of the nets according to the routing specification is performed first for the nets having the highest ranking.

Utilization of the monitoring of the monotonically decreasing function for the ranking of the nets can be a simple and elegant solution for computer automation of the optimization process. Moreover, different types of functions can be used for achieving optimum performance of the optimization for different types of integrated circuits having distinctive features of nets used therein.

In another embodiment, the method further comprises: generating a monotonically increasing function of the deviation parameter. The monotonically increasing function specifies a maximum allowable rectilinear Steiner ratio for the correspondingly ranked net used for the generating of the new layouts of the nets according to the routing specification.

This embodiment may formulate topological constraints for the generation of the new layouts. The tightest topological constraints are generated for the nets in which layouts have the biggest deviation parameters.

In another embodiment, the monotonically decreasing function is a step function.

Utilization of this type of the monotonically decreasing function may enable sorting of nets in bins, wherein all nets of each bin have the same ranking. This feature may be advantageous for integration of the optimization procedure with other software tools/procedures used for design of the integrated circuits because sorting of various devices/components in bins according to their properties is very often used in various procedures related to the design and manufacturing of integrated circuits.

In another embodiment, the monotonically increasing function is another step function. Each step of the monotonically decreasing step function has a corresponding step of the monotonically increasing function.

The monotonically decreasing function and the monotonically increasing function of this type may enable sorting of the nets in bins corresponding to steps of functions. Nets of each bin have the same ranking and topological constraints. As a result thereof, layouts of the nets of one bin can be generated several times before layouts of nets of the other bins are generated. The repetitive generation of the layouts of the nets of one bin can enable selecting the best variant of the layout, i.e. in other words, perform local (iterative) optimization of layouts of the nets of one bin in the process of generation of layouts of all nets.

FIG. 1 illustrates a flow diagram of a computer-implemented method (design process) for generating layouts of nets connecting source cells and sink cells in an integrated circuit.

The flow diagram begins with a process block 400. In the process block 400, a routing specification for the nets of the integrated circuit and a target performance parameter for each of the nets are received. The routing specification can comprise information about electrical connection of the source cells and the sink cells and layouts of the source and the sink cells. The target performance parameters specify a propagation property (e.g., a required propagation property) of electrical signals in the nets. For instance, the propagation property specified in the target performance parameter of the net can be time of error free propagation of the electrical signal in this net, i.e. time needed for the electrical signal generated at the source cell to reach all of the sink cells connected by this net. Alternatively or in addition, the propagation property specified in the target performance parameter of the net can be a slew rate, i.e. rate of voltage rise at the sink terminals connected by this net, when the electrical signal reaches the sink terminals.

A process block 401 is executed after the process block 400. In the process block 401, layouts of the nets according to the routing specification are generated. At this stage very little information about actual performance of the layouts is known. The constraints for the generation of the layouts can be generated on a basis of design rules determined by the process used for manufacturing of the integrated circuit. Further constraints can be derived from initial estimates of the actual performance values of the layouts being generated.

Figure 2:
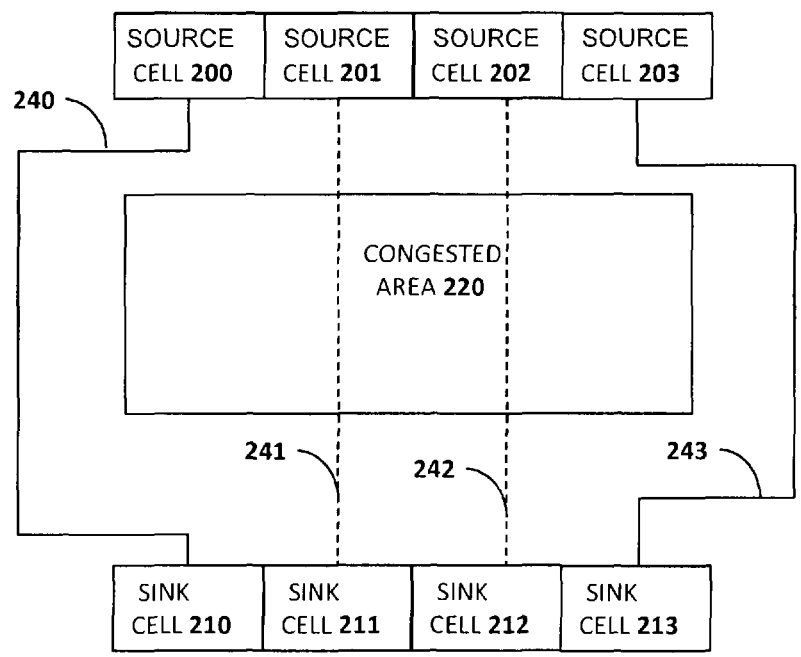
FIG. 2 illustrates a layout of nets connecting source cells and sink cells in an integrated circuit.

An example layout of the nets is illustrated in FIG. 2. A net 240 connects a source cell 200 and a sink cell 210. A net 241 connects a source cell 201 and a sink cell 211. A net 242 connects a source cell 202 and a sink cell 212. A net 243 connects a source cell 203 and a sink cell 213. Since an area 220 is congested by other nets, the process of the generation of the layouts resulted in a topology wherein only two layouts of the nets 241 and 242 are routed through the congested area 220. The other two layouts of the nets 243 and 240 are generated in way that they do not intersect the congested area 220.

Returning to FIG. 1, process block 402 is executed after the process block 401. In the process block 402, an actual performance parameter for each of the nets in the layouts is generated. The actual performance parameters specify a calculated actual propagation property of electrical signals in the nets. The actual propagation property can comprise an actual time of an error free propagation of the electrical signal in the net and/or actual slew rate.

A process block 410 is executed after the process block 402. In the process block 410, a deviation parameter for each of the performance parameters is generated. Each of the deviation parameters is indicative of a degree of deviation of the respective actual performance parameter from its target performance parameter. For instance, a slack can be the deviation parameter. The slack of each net is a mathematical difference of the target time of error free propagation of electrical signal in the respective net and the actual time of the error free propagation of electrical signal in the respective net. If the electrical signal propagates in the net longer (faster) than specified in the routing specification, then the slack is negative (positive). In modern digital circuitry, typical slack values are in the range of 1-100 ps.

A decision process block 406a is executed after the process block 410. If the current layouts of the nets have required performance specified either in the routing specification or by the designer conducting the optimization process, then the decision process block causes execution of a process block 408; otherwise, the decision process block causes execution of a process block 403. One criterion for causing following of either the YES branch or the NO branch of this decision process block can be a verification of whether at least one of the deviation parameters is less than a third threshold. The third threshold and the list of the nets which deviation parameters are ought to be compared against the third threshold value can be specified in the routing specification.

Turning back to the example of the layouts of the nets depicted in FIG. 2, the evaluation of the deviation parameters of the layouts of the nets 240-243 reveals that the layouts of the nets 240 and 243 have higher negative slacks than negative slacks of the layouts of the nets 241 and 242 because the latter layouts have shorter paths.

Referring again to FIG. 1, a process block 403 is executed after the process block 410. In the process block 403, new layouts of the nets are generated according to the routing specification. In contrast to the process block 401, the generation of the new layouts is determined by a ranking of each net, wherein the ranking is performed according to the respective deviation parameter of each net. The deviation parameters used for the ranking are generated either in the process block 410 or in a subsequent process block 405 which will be described further on in the text. The nets which previously generated layouts having the highest deviation parameters, have the highest ranking. As a result thereof, these nets are layout first.

Figure 3:
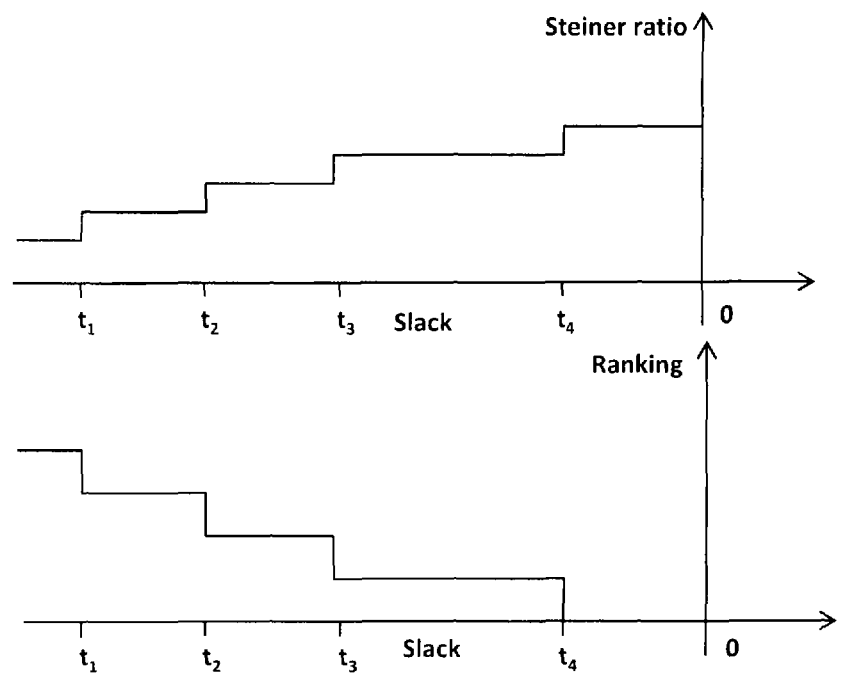
FIG. 3 illustrates a ranking function and a Steiner ratio function.

The ranking can be determined by a monotonically decreasing function of a deviation parameter. An example ranking function is depicted in FIG. 3. In this case, the monotonically decreasing function is a step function. The slack value is an argument of the monotonically decreasing function. Nets having negative slack bigger than $t_4$ have a ranking equal to zero. In this example, these nets are layout after all other nets. Nets having negative slack in an interval $[t_3; t_4]$ have a higher ranking than the nets having negative slack bigger than $t_4$. Nets having negative slack in an interval $[t_2; t_3]$ have a higher ranking than the nets having negative slack in the interval $[t_3; t_4]$. Nets having negative slack in an interval $[t_1; t_2]$ have a higher ranking than the nets having negative slack in the interval $[t_2; t_3]$. Nets having negative slack less than $t_1$ have the highest ranking, thus they are layout first in the process block 403.

Besides ranking of order of the layouts, additional topological constraints can be used for generating the layouts in the process block 403. A monotonically increasing function of the deviation parameter can be used for determining a maximum allowable rectilinear Steiner ratio for the layout of nets. The rectilinear Steiner ratio determines a ratio of length of a wiring connecting two terminals in the integrated circuit and a minimum possible length of the wiring connecting the same terminals, wherein the wiring consists of rectilinear paths. If the layout of the net has the rectilinear Steiner ratio equal to one, then the length of the paths forming the layout is the minimum possible length. If the layout of the net has the rectilinear Steiner ratio bigger than one, the length of the paths forming the layout is bigger than the minimum possible length.

Determining topological constraints for the generation of the new layouts in the process block 403 as a maximum allowable rectilinear Steiner ratio with the help of a monotonically decreasing function of the deviation parameter results in generation of the layouts of the nets having high deviation parameters with a lower rectilinear Steiner ratio than the nets having a low deviation parameter. Application of these topological constraints in combination with ranking of the order of the generation of the layouts may result in the generation of the new layouts having reduced spread of the deviation parameters and/or reduction in the deviation parameters.

The topological constraints, such as maximum allowable rectilinear Steiner ratio, can be determined in different ways. The value of the topological constraint can be determined as a minimum of a value of the topological constraint used in the previous iteration and a value of the topological constraint calculated in the present iteration.

The monotonically increasing function can be a step function. An example monotonically increasing step function of the slack value for the determination of the maximum allowable Steiner ratio is depicted in FIG. 3. Every step of this function has a corresponding step of the function for the determination of a ranking depicted in the same figure. This way of the determination of the functions enables sorting of the nets in bins. All nets in a bin have the same ranking and the same maximum allowable rectilinear Steiner ratio.

This way of sorting of the nets can enable local optimization of the layouts of the nets of one bin during execution of the process block 403. For instance, several layouts can be generated for the nets of the same bin and then one layout of the nets of the bin can be chosen as the most appropriate.

Figure 4:
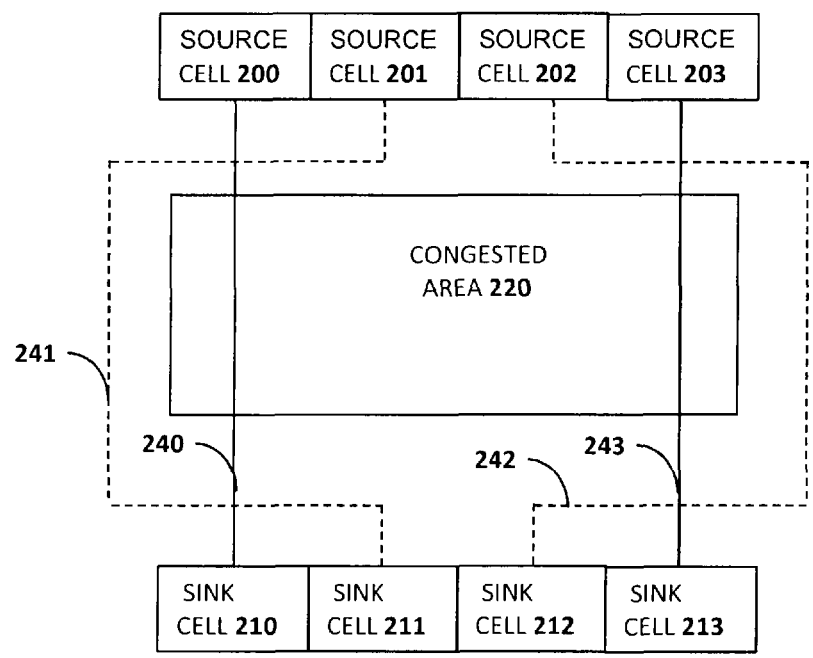
FIG. 4 illustrates a layout of nets connecting source cells and sink cells in an integrated circuit.

Turning back to the example of the layouts of the nets depicted in FIG. 2, execution of the process block 403 results in the generation of the new layouts of the nets depicted in FIG. 4. Execution of the process block 410 revealed that the layouts of the nets 240 and 243 have higher negative slacks than negative slacks of the layouts of the nets 241 and 242. As a result thereof, these nets 240 and 243 have a higher ranking than the nets 241 and 242. The high ranked nets 240 and 243 were layout before the low ranked nets 241 and 242. In addition, the layouts of the nets 240 and 243 were generated in a way that they have a lower rectilinear Steiner ratio than the layouts of the nets 241 and 242 (FIG. 4).

Referring to FIG. 1, a process block 404 is executed after the process block 403. In the process block 404, the performance of the new layouts of the nets generated in the process block 403 is evaluated. Afterwards, the performance parameters generated either as a result of execution of the process block 402 or as a result of the previous execution of the process block 404 are updated using the evaluation of the performance of the new layouts.

A process block 405 is executed after the process block 404. In the process block 405, the deviation parameters are updated using the respective updated performance parameters generated as a result of execution of the process block 404.

A decision process block 406b is executed after the process block 405. If the current layouts of the nets have required performance specified either in the routing specification or by the designer conducting the optimization process, then the decision process block causes execution of a process block 408; otherwise, the decision process block causes execution of a decision process block 407. One criterion for causing following of either the YES branch or the NO branch of this decision process block can be a verification of whether at least one of the deviation parameters is less than a third threshold. The third threshold and the list of the nets which deviation parameters are ought to be compared against the third threshold value can be specified in the routing specification.

In the process block 408, the current layouts are saved as the layouts having the required performance, e.g. complying with the target performance parameters specified in the routing specification.

The decision process block 407 loops to an iterative execution of layout optimization if the optimization process did not reach its saturation. If the latter statement is true, then the decision process block causes again execution of the process block 403; otherwise, it causes execution of the process block 409.

Various criteria can be used for checking whether the optimization process has reached its saturation, since no substantial improvement in the performance of the layouts of the nets is possible. One criterion can be verification of whether the performance parameter for a newly layout net has an improvement over the respective performance parameter of the previous iteration with the improvement being less than a fourth threshold value.

When the latter statement is true, then the optimization process has reached its saturation and the decision process block causes execution of the process block 409.

The newly layout net in the aforementioned criterion can be the net having the highest deviation parameter generated in the last executed iteration. The aforementioned criterion can be combined with another one, so that the optimization process is considered to reach the saturation only when both criteria are complied with.

Another criterion may be verification of whether an indicator value is less than a second threshold value. The indicator value can be calculated after the process block 405 and before the decision process block 407. Calculation of the indicator value can be done in the decision process block 407 as well. The indicator value is calculated for a set of the deviation parameters. The indicator value is a measure of a difference between a sum of the deviation parameters of the set of deviation parameters generated in the previous iteration and a sum of the deviation parameters of the set of deviation parameters generated in the present iteration.

The set of the deviation parameters can comprise all of the deviation parameters or only the deviation parameters of the most critical nets. One way to calculate the indicator value is to calculate a first sum of the deviation parameters of the set generated in one of the iterations, a second sum of the deviation parameters of the set generated in the iteration being the next following iteration of the one of the iterations, and the indicator value being equal to the first sum minus the second sum.

In the process block 409, the current layouts are saved as the best possible layouts.

Figure 5:
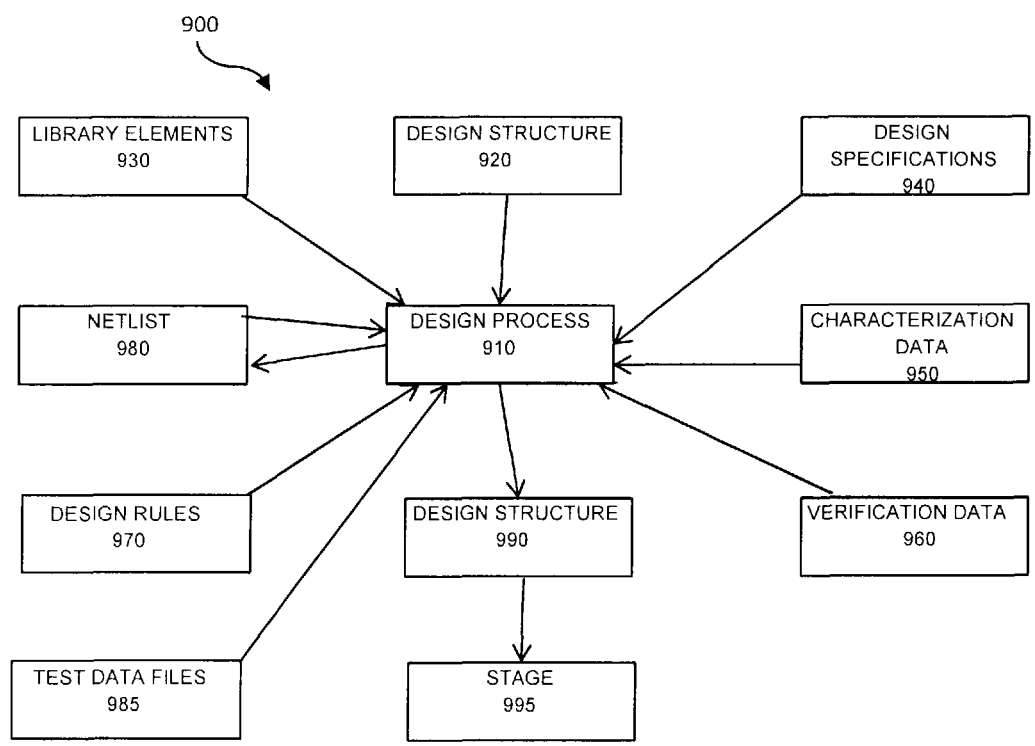
FIG. 5 illustrates a flow diagram of a design process used in semiconductor design, manufacture, and/or test.

FIG. 5 is a flow diagram of a design process used in semiconductor design, manufacture, and/or test. The process for generating layouts of nets connecting source cells and sink cells in an integrated circuit, which flow diagram is depicted in FIG. 1, can be part of the design process depicted in FIG. 5. FIG. 5 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices described above and shown in FIGS. 2 and 4. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 5 illustrates multiple such design structures including an input design structure 920 that is processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910 generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as shown in FIGS. 2 and 4. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910, in one example, employs and incorporates hardware and/or software modules for synthesizing, translating, or otherwise processing a design/simulation functional equivalent of the components, circuits, devices, or logic structure shown in FIG. 2 or 4 to generate a netlist 980 which may contain design structures, such as design structure 920. Netlist 980 may comprise, for example, compiled or otherwise processed data structures representing a list of wires, discrete components, logic gates, control circuits, I/O devices, models, etc. that describe the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools, such as HDL compilers and simulation model build tools, to process design structure 920 together with some or all of the depicted supporting data structures along with any additional mechanical design or data (if applicable), to generate a second design structure 990.

Design structure 990 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 920, design structure 990 comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-4. In one embodiment, design structure 990 may comprise a compiled, executable HDL simulation model that functionally simulates the devices shown in FIGS. 2 and 4.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIG. 1. Design structure 990 may then proceed to a stage 995 where, for example, design structure 990: proceeds to tape-out, is released to manufacturing, is released to a mask house, is sent to another design house, is sent back to the customer, etc.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for generating layouts of nets connecting source cells and sink cells for use in fabrication of an integrated circuit, the computer system comprising:
a memory; and
a processor in communications with the memory, wherein the computer system is configured to perform a method, said method comprising:
receiving a routing specification for the nets of the integrated circuit and a target performance parameter for each of the nets, the target performance parameters for each of the nets specifying a propagation property of electrical signals in the nets, comprising a time of error free propagation of the electrical signals in the nets, and a slew rate;
generating layouts of the nets according to the routing specification;
generating an actual performance parameter for each of the nets in the layouts, the actual performance parameters specifying a calculated actual propagation property of electrical signals in the nets and a calculated actual slew rate;
generating deviation parameters, each of the deviation parameters being indicative of a degree of deviation of the respective actual performance parameter from its target performance parameter; and
repetitively executing the following:
generating new layouts of the nets according to the routing specification, the new layouts being generated based on a topological constraint in combination with a ranking of an order of the generation of the layouts, the order of the generation being determined by the ranking of each net, and determining the topological constraint for the new layouts by generating a monotonically increasing function of a respective deviation parameter, the ranking being performed according to the respective deviation parameter of each net, wherein the ranking is described by a monotonically decreasing function of the respective deviation parameter, wherein the monotonically decreasing function is a step function, and wherein a slack value and the slew rate are arguments of the monotonically decreasing function, the generation of the new layouts of the nets according to the routing specification being performed first for the nets having a highest ranking, the nets with the highest ranking having highest deviation parameters of the deviation parameters, and determining the topological constraint for the new layout comprises generating a monotonically increasing function of the respective deviation parameter, the monotonically increasing function specifying a maximum allowable rectilinear Steiner ratio for a correspondingly ranked net used for the generating of the new layouts of the nets, according to the routing specification;

generating an updated performance parameter for each of the new layouts;

updating the deviation parameter for each of the new layouts with the respective updated performance parameter, the repetitive execution being performed until a first condition or a second condition is fulfilled, the first condition comprising that at least one of the deviation parameters is less than a first threshold value, and the second condition comprising that for a present iteration a performance parameter for a new layout net has an improvement over a respective performance parameter of a previous iteration with the improvement being less than a second threshold value, wherein the deviation parameter of said new layout net is bigger than deviation parameters of other nets for the present iteration;

generating an indicator value for a set of the deviation parameters for one or more most critical nets of the nets, the indicator value being a measure of a difference between a first sum of the deviation parameters of the set of deviation parameters for the one or more most critical nets generated in the previous iteration and a second sum of the deviation parameters of the set of deviation parameters for the one or more most critical nets generated in the present iteration, the present iteration being a next iteration following the previous iteration, the indicator value being equal to the first sum minus the second sum, and the second condition further comprising that the indicator value is less than a third threshold value; and saving the new layout net as a best possible layout for the integrated circuit; and based on the saving, fabricating the integrated circuit in accordance with the new layout net.

2. The computer system of claim 1, wherein each step of the monotonically decreasing step function has a corresponding step of the monotonically increasing function.

3. A computer program product for generating layouts of nets connecting source cells and sink cells for use in fabrication of an integrate circuit, the computer program product comprising:

a computer readable storage medium readable by a processing circuit and storing instructions for execution by the processing circuit for performing a method comprising:

receiving a routing specification for the nets of the integrated circuit and a target performance parameter for each of the nets, the target performance parameters for each of the nets specifying a propagation property of electrical signals in the nets, comprising a time of error free propagation of the electrical signals in the nets, and a slew rate;

generating layouts of the nets according to the routing specification;

generating an actual performance parameter for each of the nets in the layouts, the actual performance parameters specifying a calculated actual propagation property of electrical signals in the nets and a calculated actual slew rate;

generating deviation parameters, each of the deviation parameters being indicative of a degree of deviation of the respective actual performance parameter from its target performance parameter; and repetitively executing the following:

generating new layouts of the nets according to the routing specification, the new layouts being generated based on a topological constraint in combination with a ranking of an order of the generation of the layouts, the order of the generation being determined by the ranking of each net, and determining the topological constraint for the new layouts by generating a monotonically increasing function of a respective deviation parameter, the ranking being performed according to the respective deviation parameter of each net, wherein the ranking is described by a monotonically decreasing function of the respective deviation parameter, wherein the monotonically decreasing function is a step function, and wherein a slack value and the slew rate are arguments of the monotonically decreasing function, the generation of the new layouts of the nets according to the routing specification being performed first for the nets having a highest ranking, the nets with the highest ranking having highest deviation parameters of the deviation parameters, and determining the topological constraint for the new layout comprises generating a monotonically increasing function of the respective deviation parameter, the monotonically increasing function specifying a maximum allowable rectilinear Steiner ratio for a correspondingly ranked net used for the generating of the new layouts of the nets, according to the routing specification;

generating an updated performance parameter for each of the new layouts;

updating the deviation parameter for each of the new layouts with the respective updated performance parameter, the repetitive execution being performed until a first condition or a second condition is fulfilled, the first condition comprising that at least one of the deviation parameters is less than a first threshold value, and the second condition comprising that for a present iteration a performance parameter for a new layout net has an improvement over a respective performance parameter of a previous iteration with the improvement being less than a second threshold value, wherein the deviation parameter of said new layout net is bigger than deviation parameters of other nets for the present iteration;

generating an indicator value for a set of the deviation parameters for one or more most critical nets of the nets, the indicator value being a measure of a difference between a first sum of the deviation parameters of the set of deviation parameters for the one or more most critical nets generated in the previous iteration and a second sum of the deviation parameters of the set of deviation parameters for the one or more most critical nets generated in the present iteration, the present iteration being a next iteration following the previous iteration, the indicator value being equal to the first sum minus the second sum, and the second condition further comprising that the indicator value is less than a third threshold value; and saving the new layout net as a best possible layout for the integrated circuit; and based on the saving, fabricating the integrated circuit in accordance with the new layout net.

4. The computer program product of claim 3, wherein each step of the monotonically decreasing step function has a corresponding step of the monotonically increasing function.

\* \* \* \* \*